United States Patent
Howard et al.

(10) Patent No.: US 6,227,495 B1
(45) Date of Patent: May 8, 2001

(54) SYNCHRONIZED AUTONOMOUS DOCKING SYSTEM

(75) Inventors: Richard T. Howard; Michael L. Book; Thomas C. Bryan, all of Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/228,033

(22) Filed: Dec. 10, 1998

(51) Int. Cl.[7] ....................................................... B64G 1/64
(52) U.S. Cl. ................................................................. 244/161
(58) Field of Search ............................... 244/158 R, 159, 244/161; 358/103, 109, 107

(56) References Cited

U.S. PATENT DOCUMENTS

| | | | |
|---|---|---|---|
| 3,535,543 | * 10/1970 | Dailey | 244/159 |
| 4,295,740 | * 10/1981 | Sturges, Jr. | 244/161 |
| 5,109,345 | * 4/1992 | Dabney et al. | 244/161 |
| 5,291,195 | * 3/1994 | Gross | 244/161 |
| 5,734,736 | * 3/1998 | Palmer et al. | 244/161 |

\* cited by examiner

Primary Examiner—Galen L. Barefoot
(74) Attorney, Agent, or Firm—James J. McGroary; Robert L. Broad, Jr.

(57) ABSTRACT

A synchronized target subsystem for use in an automated docking system for docking a chase vehicle with a target vehicle wherein the chase vehicle is provided with a video camera for feeding digitized frames to an image processing unit which controls a timing circuit. The timing circuit turns on the video camera to digitize a foreground frame and at the same time turns on a transmitter on the chase vehicle. A power generating antenna on the target vehicle receives the transmitted signal from the transmitter and actuates lights on the chase vehicle so that these lights appear in the foreground frame. After the foreground frame has been grabbed, the timing circuit turns the transmitter off and signals the video camera to digitize a background frame. The image processing unit subtracts the background frame from the foreground frame and provides a docking signal.

5 Claims, 1 Drawing Sheet

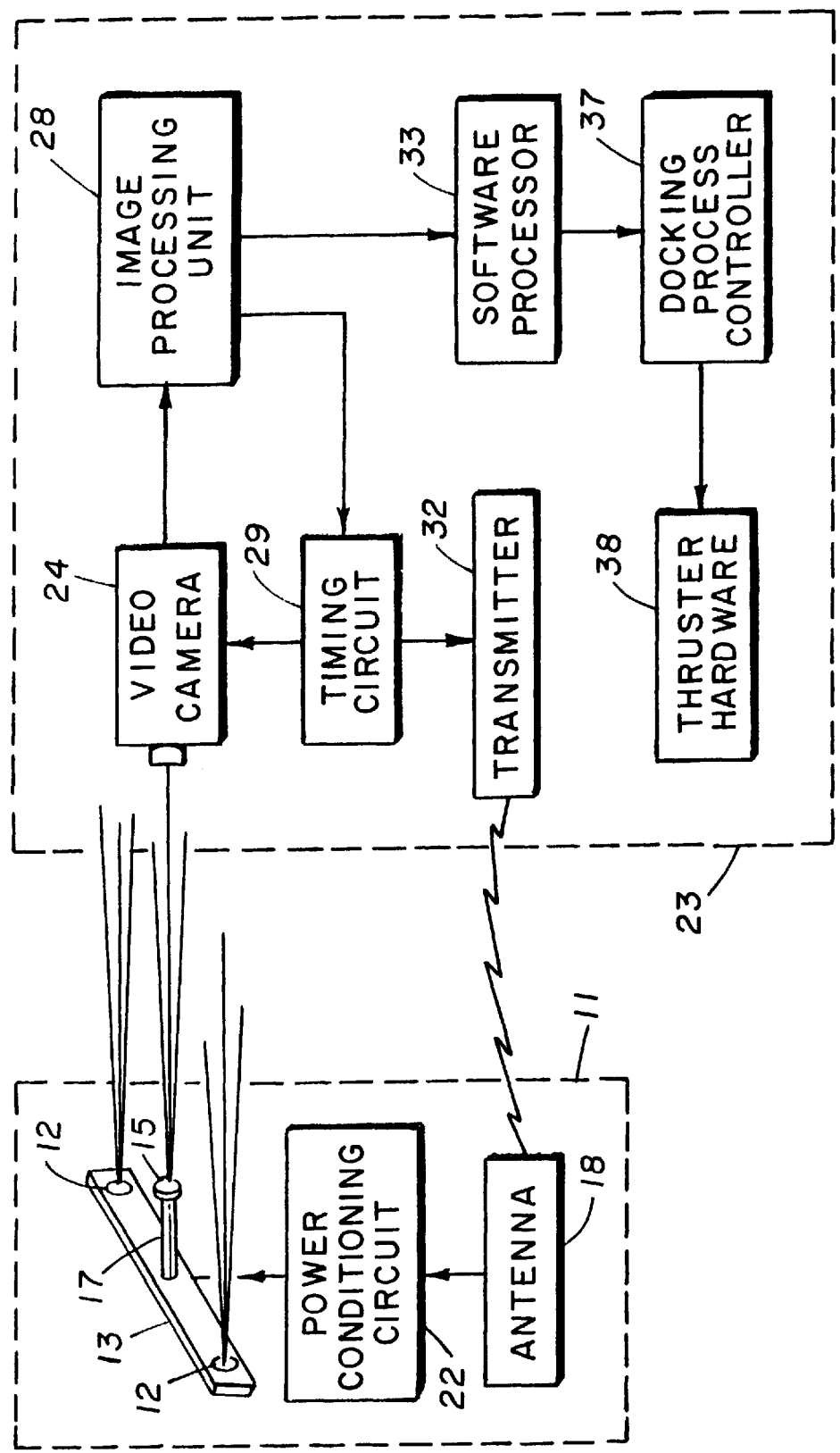

SYNCHRONIZED AUTONOMOUS DOCKING SYSTEM

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

This invention relates to autonomous docking or station keeping systems for space vehicles.

2. Prior Art

U.S. Pat. No. 5,490,075 discloses an automated docking system wherein Global Sensing receivers on the target and the chase vehicle synchronize lights on the target and a video imaging device on the chase vehicle such that these lights and the video imaging device operate in synchronism with each other to guide the chase vehicle to the target. A disadvantage of this system is that it requires more equipment (Global Position Sensing receivers on both the target and the chase vehicle).

U.S. Pat. No. 5,109,345 discloses an autonomous docking system which uses laser diodes mounted on a chase vehicle for directing light toward reflectors mounted on a target vehicle for docking the chase vehicle with the target vehicle. The disadvantage of this system is that the reflected light is much dimmer that an active light.

SUMMARY OF THE INVENTION

A synchronized target subsystem for use in an automated docking or station keeping system for docking a chase vehicle with a target vehicle wherein the chase vehicle is provided with a video camera for feeding digitized frames to an image processing unit which controls a timing circuit. The timing circuit turns on the video camera to digitize a background frame with the lights on the target vehicle off and at the same time turns on a transmitter on the chase vehicle to operate at a predetermined modulation or power level. A power generating antenna on the target vehicle receives the transmitted signal from the transmitter and, upon receiving an actuating signal from the transmitter, actuates lights on the target vehicle so that these lights appear in the foreground frame. The actuating signal from the transmitter may be a different modulation of the transmitted signal or a more powerful transmission. The image processing unit subtracts the background frame from the foreground frame and provides a docking signal or station keeping signal.

DETAILED DESCRIPTION OF THE DRAWING

The single FIGURE of the drawing is a schematic drawing showing the components which make up the subsystem of this invention.

DETAILED DESCRIPTION OF THE INVENTION

Referring now in detail to the drawing, there is shown a system of lights carried by a target vehicle 11. The system of lights includes lights 12 mounted on base plane 13 at a spaced distance apart. A post 17 located between the lights 12 projects forward of the base plane 13 and carries a third light 15 mounted on the end of the post 17.

A receiving antenna 18 carried by the target vehicle 11 is connected to a power conditioning circuit 22. The power conditioning circuit serves to condition power received from the antenna 18 to a voltage which is suitable for the lights and to connect the antenna to the lights upon receipt of an actuating signal from the transmitter. The lights will be on so long as the antenna is receiving the actuating suitable signal. This actuating signal may be a different modulation of the signal transmitted or an increase in the power level of the signal transmitted.

A chase vehicle 23 carries a video camera 24 which feed signals to an image processing unit 28 which feeds signals to a timing circuit 29. The timing circuit 29 controls a transmitter 32 and the video camera 24 as described below. The image processing unit 28 also subtracts a background frame from a foreground frame and sends a docking or station keeping signal to a software processor 33 which in turn sends docking signals to a docking process controller 37. The docking process controller sends control signals to thruster hardware 38. The software processor 33, the docking process controller and the thruster hardware serve to dock the chase vehicle 23 with the target vehicle as described in U.S. Pat. No. 5,490,075 which is incorporated herein by reference.

The transmitter may be operated continuously at a predetermined modulation or power level. When it is desired to connect the lights 12 and 15 to the antenna, the actuating signal sent from the transmitter may be modulated in a different way or at a higher power level.

In operation, the timing circuit 29 sends signals to turn on the transmitter 32 and the video camera 24. When the transmitter 32 is turned on the transmitted signal generates power in the receiving antenna 18, this power acting through the power conditioning circuit 22 to turn on the lights 12 and 15 when the actuating signal is received from the transmitter. This actuating signal is sent after the camera has digitized a background frame. The lights are turned on for a sufficient time for the video camera 24 to digitize a foreground frame with the lights on. The image processing unit subtracts the background frame from the foreground frame and sends a docking or station keeping signal to the software processor. This process is continued until the docking of the chase vehicle with the target vehicle is completed or as long as station keeping is desired.

What is claimed is:

1. A synchronized target subsystem for use in automated docking systems wherein a chase vehicle is docked with a target vehicle, said synchronized target subsystem comprising,
   a. a video camera carried by the chase vehicle for digitizing background and foreground frames,
   b. an image processing unit connected to the camera,
   c. a transmitter carried by the chase vehicle for directing a signal toward the target vehicle when the transmitter is actuated,
   d. a timing circuit connected to the image processing unit for actuating the video camera and the transmitter,
   e. a plurality of lights carried by the target vehicle,
   f. a receiving antenna carried by the target vehicle for generating power when the signal from the transmitter is received, and
   g. a power conditioning unit connected between the antenna and the lights for conditioning the power from the antenna to a voltage suitable for operating the lights.

2. The synchronized target subsystem of claim 1 wherein the timing circuit actuates the transmitter to transmit a signal for a sufficient time to allow the video camera for to acquire a foreground frame, said timing circuit then turning off the transmitter and causing the video camera to acquire a background frame.

3. The system of claim 2 wherein the image processing unit subtracts the background frame from the foreground frame to provide a docking signal.

4. The subsystem of claim 3 wherein the lights comprise first and second lights mounted on a base plane and a third light mounted at the end of a post extending outwardly from the base plane.

5. A synchronized target subsystem for use in automated docking systems wherein a chase vehicle is docked with a target vehicle, said synchronized target subsystem comprising;

- a plurality of light sources carried by the target vehicle for transmitting a plurality of light signals,
- a single video camera carried by the chase vehicle for directly receiving said light signals from the target vehicle and for digitizing background and foreground frames based on said light signals,
- an image processing unit, carried by the chase vehicle and connected to said video camera, for processing said background and foreground frames,
- a transmitter carried by the chase vehicle for directing a control signal toward the target vehicle when said transmitter is actuated,
- a timing circuit, carried by the chase vehicle and connected to the image processing unit, the video camera and the transmitter, for actuating the video camera and transmitter,
- a receiving antenna carried by the target vehicle for generating power when the control signal from the transmitter is received, and
- a power conditioning unit connected between the antenna and the light sources for conditioning the power from the antenna to a voltage suitable for operating the light sources.

* * * * *